United States Patent
Chen et al.

(10) Patent No.: US 9,563,686 B2
(45) Date of Patent: Feb. 7, 2017

(54) TABLE ATTRIBUTE MANAGEMENT FOR REPLICATED DATA TABLES

(71) Applicants: Yingyu Chen, Shanghai (CN); Han Li, Shanghai (CN); Yihan Song, Shanghai (CN)

(72) Inventors: Yingyu Chen, Shanghai (CN); Han Li, Shanghai (CN); Yihan Song, Shanghai (CN)

(73) Assignee: SAP SE, Walldorf (DE)

( * ) Notice: Subject to any disclaimer, the term of this patent is extended or adjusted under 35 U.S.C. 154(b) by 528 days.

(21) Appl. No.: 14/078,123

(22) Filed: Nov. 12, 2013

(65) Prior Publication Data

US 2015/0088823 A1    Mar. 26, 2015

(30) Foreign Application Priority Data

Sep. 26, 2013 (CN) .......................... 2013 1 0445577

(51) Int. Cl.
*G06F 17/30* (2006.01)

(52) U.S. Cl.
CPC ............................. *G06F 17/30578* (2013.01)

(58) Field of Classification Search
CPC ................................................ G06F 17/30578
See application file for complete search history.

(56) References Cited

U.S. PATENT DOCUMENTS

2012/0005160 A1* 1/2012 Naicken ............ G06F 17/30587
707/627

OTHER PUBLICATIONS

SAP Landscape Transformation 2.0 an Overview, AGS SLO Product Management, Nov. 2011, 45 pages.

* cited by examiner

*Primary Examiner* — Dinku Gebresenbet
(74) *Attorney, Agent, or Firm* — Brake Hughes Bellermann LLP (57) ABSTRACT

A table selector may receive a selection of a replicated table storing data replicated from an original table of a first system, the replicated table being stored using a second system and currently executing a process of receiving the replicated data. A suspension manager may suspend the process of receiving the replicated data, and a table attribute manager may change a replicated table attribute of the replicated table, while the process of receiving the replicated data is suspended. The suspension manager may then resume the process of receiving the replicated data.

20 Claims, 6 Drawing Sheets

TABLE ATTRIBUTE MANAGEMENT FOR REPLICATED DATA TABLES

CROSS-REFERENCE TO RELATED APPLICATION

This application claims priority under 35 U.S.C. §119 to Chinese Patent Application No. 201310445577.9, filed on Sep. 26, 2013, entitled "TABLE ATTRIBUTE MANAGEMENT FOR REPLICATED DATA TABLES", which is incorporated herein by reference in its entirety.

TECHNICAL FIELD

This description relates to providing data replication.

BACKGROUND

Many software applications are designed to be capable of processing large quantities of data, and may therefore be associated with one or more databases which are capable of storing such data. For example, business applications devoted to customer relationship management, enterprise resource planning, and supply chain management, may be required to store and process large numbers of customer records, financial records, supplier data, and other business data.

Such applications may be developed and deployed for execution using one or more platforms, infrastructures, and/or computing systems. However, over time, it may be desirable to utilize the stored data in the context of a separate platform, infrastructure, and/or computing system, and/or in the context of a same or different software application. For example, over time, a new, improved platform might be developed, that may be, e.g., faster and/or more cost effective, than an original or previous computing platform.

Consequently, operators of software applications may wish to transfer or otherwise replicate data from an original or current location for use in conjunction with a separate computing system. For example, such replication may be advantageous, e.g., in order to improve a processing speed at which the data is processed, and/or to take advantage of features of the separate computing system that are not available in the original/current system.

However, when an amount of data to be transferred is large, and/or when a transfer latency is high, and/or in scenarios in which new data is currently being collected at the original system, it may occur that a replication process for replicating data from the original system to a new, separate system requires non-trivial (or open-ended) transfer times. Therefore, during such transfer times, an operator may wish to make changes to a manner in which the replicated data is stored at the separate, receiving system. Unfortunately, it may be difficult and resource-intensive to make such modifications, especially without disrupting the transfer process. As a result, operators may experience frustration during the transfer process, and may lose some or all of a desired benefit of using the separate computing system.

SUMMARY

According to one general aspect, a system may include instructions recorded on a non-transitory computer-readable medium, and executable by at least one processor. The system may include a table selector configured to cause the at least one processor to receive a selection of a replicated table storing data replicated from an original table of a first system, the replicated table being stored using a second system and currently executing a process of receiving the replicated data. The system may include a suspension manager configured to cause the at least one processor to suspend the process of receiving the replicated data, and a table attribute manager configured to cause the at least one processor to change a replicated table attribute of the replicated table, while the process of receiving the replicated data is suspended. The suspension manager may be further configured to cause the at least one processor to resume the process of receiving the replicated data.

Implementations may include one or more of the following features. For example, the table selector may be configured to select the replicated table based on receipt of a selection of a database schema that includes the replicated table. The table selector may be configured to select the replicated table based on receipt of a selection of an application utilizing the replicated table.

The suspension manager may be configured to cause the at least one processor to suspend the process of receiving the replicated data including inserting a suspend order into a job queue governing data replication job orders. The suspension manager may be configured to cause the at least one processor to suspend the process of receiving the replicated data including querying a status table to determine that a status of the inserted suspend order indicates that the suspension of the process of receiving the replicated data has occurred. The suspension manager may be configured to cause the at least one processor to resume the process of receiving the replicated data including inserting a resume order into the job queue. The suspension manager may be further configured to cause the at least one processor to resume the process of receiving the replicated data including querying the status table to determine that a status of the inserted resume order indicates that the resumption of the process of receiving the replicated data has occurred.

The replicated table attribute may include one or more of a column table attribute, a row table attribute, a partition of the replicated table, a plain column table, a history column table, an auto-merge capability or a text search capability. The table attribute manager may include a table attribute selector configured to cause the at least one processor to access a plurality of pre-stored change procedures for implementing changes to replicated table attributes, and further configured to cause the at least one processor to select a corresponding pre-stored change procedure therefrom to implement the change to the replicated table attribute therewith. A view generator of the system may be configured to cause the at least one processor to provide at least one graphical user interface configured to receive the selection of the replicated table and the change to the replicated table attribute.

According to another general aspect, a computer-implemented method for executing instructions stored on a non-transitory computer readable storage medium may include receiving a selection of a replicated table storing data replicated from an original table of a first system, the replicated table being stored using a second system and currently executing a process of receiving the replicated data, and suspending the process of receiving the replicated data. The method may include changing a replicated table attribute of the replicated table, while the process of receiving the replicated data is suspended, and resuming the process of receiving the replicated data.

Implementations may include one or more of the following features. For example, changing the replicated table attribute may include accessing a plurality of pre-stored change procedures for implementing changes to replicated table attributes, and selecting a corresponding pre-stored change procedure therefrom to implement the change to the replicated table attribute therewith. The method may include providing at least one graphical user interface configured to receive the selection of the replicated table and the change to the replicated table attribute.

According to another general aspect, a computer program product tangibly embodied on a non-transitory computer-readable storage medium may include instructions that, when executed by at least one processor, are configured to receive a selection of a replicated table storing data replicated from an original table of a first system, the replicated table being stored using a second system and currently executing a process of receiving the replicated data, and suspend the process of receiving the replicated data. The instructions, when executed by the at least one processor, may be further configured to change a replicated table attribute of the replicated table, while the process of receiving the replicated data is suspended, and resume the process of receiving the replicated data.

Implementations may include one or more of the following features. For example, the instructions, when executed, may be further configured to cause the at least one processor to suspend the process of receiving the replicated data including inserting a suspend order into a job queue governing data replication job orders.

The instructions, when executed, may be further configured to cause the at least one processor to suspend the process of receiving the replicated data including querying a status table to determine that a status of the inserted suspend order indicates that the suspension of the process of receiving the replicated data has occurred. The instructions, when executed, may be further configured to cause the at least one processor to resume the process of receiving the replicated data including inserting a resume order into the job queue. The instructions, when executed, may be further configured to cause the at least one processor to resume the process of receiving the replicated data including querying the status table to determine that a status of the inserted resume order indicates that the resumption of the process of receiving the replicated data has occurred.

The instructions, when executed, are further configured to cause the at least one processor to access a plurality of pre-stored change procedures for implementing changes to replicated table attributes, and further configured to cause the at least one processor to select a corresponding pre-stored change procedure therefrom to implement the change to the replicated table attribute therewith. The instructions, when executed, may be further configured to cause the at least one processor to provide at least one graphical user interface configured to receive the selection of the replicated table and the change to the replicated table attribute.

The details of one or more implementations are set forth in the accompanying drawings and the description below. Other features will be apparent from the description and drawings, and from the claims.

DETAILED DESCRIPTION

Figure 1:
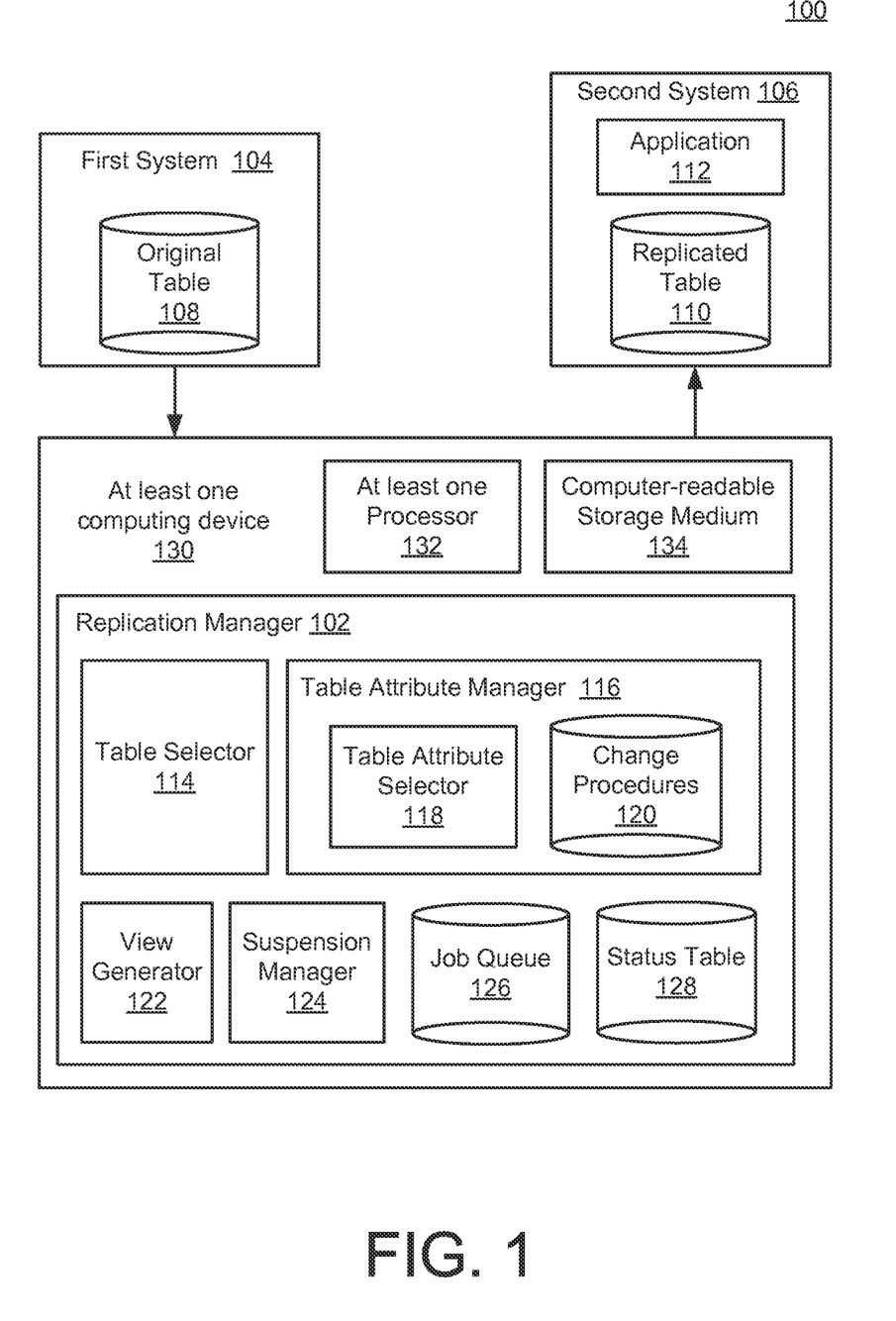
FIG. 1 is a block diagram of a system for managing replicated table attributes for replicated data.

FIG. 1 is a block diagram of the system 100 for management of replicated table attributes during data replication. More specifically, in the example of FIG. 1, a replication manager 102 interacts with a first system 104 and a second system 106, so as to thereby replicate data from an original table 108 of the first system 104 to a replicated table 110 of the second system 106. In so doing, as described in detail herein, the replication manager 102 may be configured to facilitate changes of table attributes of the replicated table 110, even while the replication process of replicating data from the original table 108 to the replicated table 110 is ongoing. Moreover, the replication manager 102 facilitates such changes to table attributes of the replicated table 110 in a manner which is straightforward and convenient for an operator of the system 100, and ensures minimal disruption of the overall data replication process.

In the example of FIG. 1, the first system 104 may be considered to conceptually represent virtually any computing system and associated software/hardware that may implement or utilize the original table 108. For example, the first system 104 may represent a particular hardware/software platform for executing the types of business applications referenced above, or virtually any software application that may utilize data from the original table 108.

Meanwhile, the second system 106 may be understood to conceptually represent virtually any computing system which may be considered by an operator of the system 100 to provide some advantage in processing, or otherwise utilizing, data of the original table 108. For example, as referenced above, the second system 106 may represent a newly available computing system, that was not available at a time of design at deployment of the first system 104. In additional or alternative examples, the second system 106 may provide faster and/or more cost effective processing of data of the original table 108. Further, the second system 106 may provide an application 112 for processing the replicated table 110, which may or may not be available or practical for use in processing data of the original table 108 at the first system 104.

In some implementations, data from the original table 108 may be permanently transferred, migrated, or otherwise replicated at the replicated table 110. In additional or alternative examples, data of the original table 108 may be collected continually by the first system 104, even while processing of replicated data from the replicated table 110 at the second system 106 continues to occur.

Thus, as described in more detail below, the replication manager 102 may be partially or completely executed using one or both of the first system 104 and the second system 106. Moreover, although not explicitly illustrated in the example of FIG. 1 for the sake of simplicity, the replication manager 102 may be configured to replicate data from a plurality of originating systems to one or more receiving systems, or from one originating system to two or more receiving systems.

In example embodiments, such as the implementations described below with respect to FIGS. 4-6, the second system 106 may represent an in-memory database, which is capable of processing large quantities of data very quickly. In the examples described below, the second system 106 is thus described by way of specific, non-limiting example with respect to the in-memory database provided by SAP AG and known as HANA. However, as described herein, it may be appreciated that the second system 106 may represent virtually any system that might be desired by an operator of the system 100 to receive replicated data from the original table 108, for processing using the application 112 of the second system 106.

In practice, an operator of the system 100 may utilize the replication manager 102 to select data of the original table 108 for replication within the replicated table 110. Therefore, for example, the replication manager 102 may offer an operator of the system 100 an ability to designate data of the original table 108 for replication at the second system 106. Further, the replication manager 102 may provide for generation of the replicated table 110 and associated table attributes thereof, to thereby enable the desired data transfer from the original table 108. For example, the replication manager 102 may simply ensure that table attributes of the replicated table 110 correspond exactly to corresponding table attributes of the original table 108. For example, the replication manager 102 may ensure that the replicated table 110 includes an identical format and other attributes of the original table 108. Consequently, subsequent replication of data from the original table 108 to the replicated table 110 may proceed in a straightforward manner.

In practice, however, it may frequently occur that an operator of the system 100 wishes to alter the table attributes of the replicated table 110, relative to table attributes of the original table 108. For example, the operator of the system 100 may wish to change the original table 108 from a row table to a column table for purposes of implementing the replicated table 110. Various other examples of such replicated table attributes are provided in detail herein, or would be apparent. In general, however, it may be appreciated that such replicated table attributes refer to virtually any characteristic or aspect of the replicated table 110 which defines or characterizes a format or a structure thereof.

As referenced above, once the replication manager 102 has been configured to conduct the described replication process of replicating data from the original table 108 to the replicated table 110, the replication manager 102 may then proceed to conduct the configured replication over, e.g., a period of minutes, hours, or days, or on an ongoing basis (in which data received by the first system 104 and stored using the original table 108 is continually being received and replicated at the replicated table 110). During such replication processing times, during which replication is occurring, the operator of the system 100 may wish to modify or otherwise manage table attributes of the replicated table 110, as referenced above.

In order to facilitate such management of replicated table attributes, the replication manager 102 may include a table selector 114 that is configured to enable the operator of the system 100 to select the replicated table 110 from among a plurality of replicated tables stored using the second system 106. Similarly, a table attribute manager 116 may be configured to enable an operator of the system 100 to select a particular table attribute of the selected replicated table 110 to be changed, and to thereafter execute the requested change.

Specifically, as shown, the table attribute manager 116 may include a table attribute selector 118, which may provide the operator of the system 100 with an ability to select a desired replicated table attribute existing with respect to the replicated table 110, and to designate a new, different table attribute for replacement therewith (or addition thereto). In order to execute the requested table attribute change, a plurality of table attribute change procedures 120 may be stored, which are configured to execute predefined commands designed to implement individual table attribute changes. For example, the change procedures 120 may represent discrete collections of structured query language (SQL) statements designed to execute a particular table attribute change. In this way, the operator of the system 100 is not required to have detailed knowledge or techniques for actually executing a desired table attribute change.

A view generator 122 may be configured to enable interaction between the operator of the system 100 and the table selector 114, as well as between the operator of the system 100 and the table attribute manager 116. For example, as illustrated and described in more detail below with respect to FIG. 3, the view generator 122 may provide a graphical user interface (GUI) to the operator, to thereby enable the operator to easily select the replicated table 110, and to thereafter select a current replicated table attribute to be changed.

In order to actually implement the requested table attribute change for the replicated table 110, the table attribute manager 116 may utilize a suspension manager 124. More specifically, the suspension manager 124 may be configured to suspend data replication for data being replicated from the original table 108 to the replicated table 110 during a time period needed by the table attribute manager 116 to implement the desired table attribute change. Once the table attribute change for the replicated table 110 has been completed, the suspension manager 124 may then implement resumption of replication of the data of the original table 108 to the now-modified replicated table 110.

In order to suspend data replication in this manner, in the example of FIG. 1, the suspension manager 124 may utilize a job queue 126 and a status table 128. Specifically, the job queue 126 may include a listing of all current, scheduled jobs associated with data replication of data from the original table 108 to the replicated table 110. The job queue 126 thus acts as a point of interface between the first system 104 and the second system 106, in that data to be replicated from the original table 108 is included as a current job within a job queue 126, while the second system 106 accesses the job queue 126 to determine data to be replicated and stored within the replicated table 110.

Meanwhile, the status table 128 may be configured to store status information reflecting a current status of each job within the job queue 126. For example, as described in detail below, the status table 128 may be utilized to assess whether particular data replication jobs have been suspended, so that modification of a related table attribute for the replicated table 110 may proceed without affecting the scheduled data replication.

Thus, in practice, in response to selection of the replicated table 110 by way of the table selector 114, and corresponding selection of a replicated table attribute to be changed by way of the table attribute selector 118, the table attribute manager 116 may request the suspension manager 124 to suspend data replication jobs that may be associated with, or affected by, the requested replicated table attribute change. Then, the suspension manager 124 may send a command to the job queue 126 to suspend all such relevant data replication jobs. The status table 128 may be consulted to verify that the job queue 126 has in fact been modified to reflect the suspended status of the specified data replication jobs, whereupon the table attribute manager 16 may proceed with changing the specified replicated table attribute of the replicated table 110 (e.g., based on a corresponding selection by the operator, in using a corresponding change procedure of the change procedures 120).

Once the requested table attribute change has been made, a table attribute manager 116 may instruct the suspension manager 124 to lift the suspension of the corresponding data replication jobs. The suspension manager 124 may then modify the job queue 126 accordingly, and request verification of corresponding changes to the job queue 126 by way of the status table 128. In this way, previously scheduled replication of data from the original table 108 to the replicated table 110 may continue.

In the example of FIG. 1, the replication manager 102 is illustrated as being implemented using at least one computing device 130, which itself includes at least one processor 132 and non-transitory computer readable storage medium 134. For example, as referenced above, the at least one computing device 130 may represent a replication server in communication with the first system 104 and the second system 106, and configured to implement data replication to be executed for one or more tables, such as the original table 108.

In addition or alternative implementations, the at least one computing device 130 may implement the replication manager 102 at one or both of the first system 104 and/or the second system 106, or may be separate from, and in communications with, both. Thus, for example, the at least one computing device 130 may be understood to represent at least two computing devices, which may be in communication with one another over a network.

Meanwhile, the at least one processor 132 may present two or more processors executing in parallel. Further, the computer readable storage medium 134 may represent virtually any non-transitory computer readable storage medium capable of storing instructions for executing the replication manager 102, as well as any associated data to be stored in conjunction with the execution of the replication manager 102.

Further, it may be appreciated that although the various components and modules 114-128 of the replication manager 102 are illustrated as individual, separate components/modules, the illustrated architecture is provided merely for the sake of example and explanation, and is not intended to limit a manner in which the replication manager 102 may be implemented. For example, any two or more elements of the replication manager 102 may be combined for implementation as a single element. Conversely, any given element of the replication manager 102 may be executed as two or more sub-elements designed to provide the same, similar, or related functions.

Figure 2:
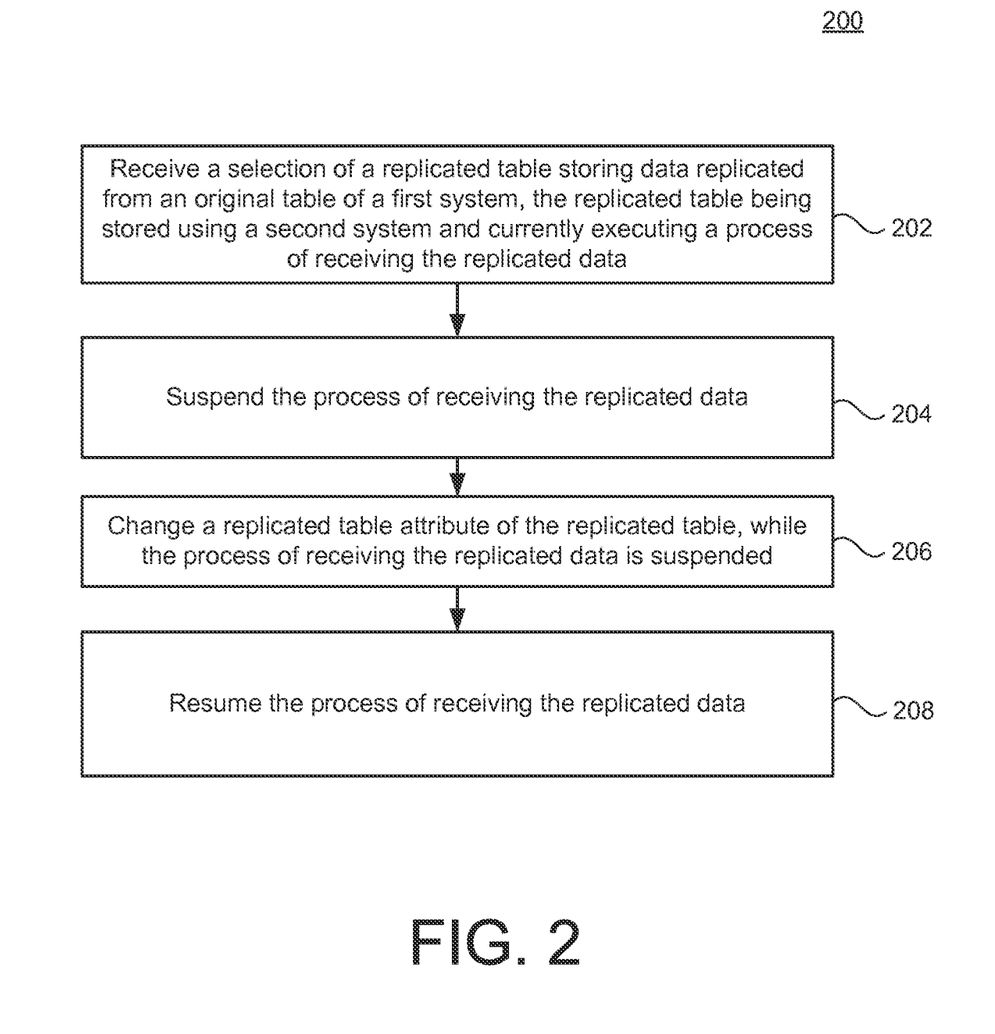
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as separate, sequential operations. However, it may be appreciated that, in additional or alternative implementations, any two or more of the operations 202-208 may be executed in a partially or completely overlapping or parallel manner, and/or in a nested, iterative, looped, or branched manner. Further, in any such implementations, it may occur that additional or alternative operations may be included, and/or one or more operations may be omitted.

In the example of FIG. 2, a selection of a replicated table storing data replicated from an original table of a first system may be received, the replicated table being stored using a second system and currently executing a process of receiving the replicated data (202). For example, the table selector 114 may receive a selection of the replicated table 110 at the second system 106, in a scenario in which an operator of the system 100 of FIG. 1 wishes to change a table attribute of the replicated table 110. As described, such selection of the replicated table 110 for modification of a table attribute thereof may occur during an ongoing process of data replication from the original table 108 from the first system to the replicated table 110.

The process of receiving the replicated data may be suspended (204). For example, the suspension manager 124 may be configured to instruct the job queue 126 to suspend any pending data replication jobs related to the replicated table 110, and may verify that the requested suspension has occurred, using a status table 128.

A replicated table attribute of the replicated table may be changed, while the process of receiving the replicated data is suspended (206). For example, the table attribute manager 116 may be configured to modify an attribute of the replicated table 110, in accordance with a table attribute selection received from the operator of the system 100 by way of the table attribute selector 118. As described, actual execution of the requested replicated table attribute change may be implemented using a corresponding change procedure of the change procedures 120.

The process of receiving the replicated data may then be resumed (208). For example, upon completion of the requested change to the replicated table attribute of the replicated table 110, the table attribute manager 116 may instruct the suspension manager 124 to resume suspended data replication jobs for the replicated table 110. Again, the suspension manager 124 may provide a corresponding instruction to the job queue 126, and may verify, by way of the status table 128, that the specified data replication jobs have been recommenced.

Figure 3:
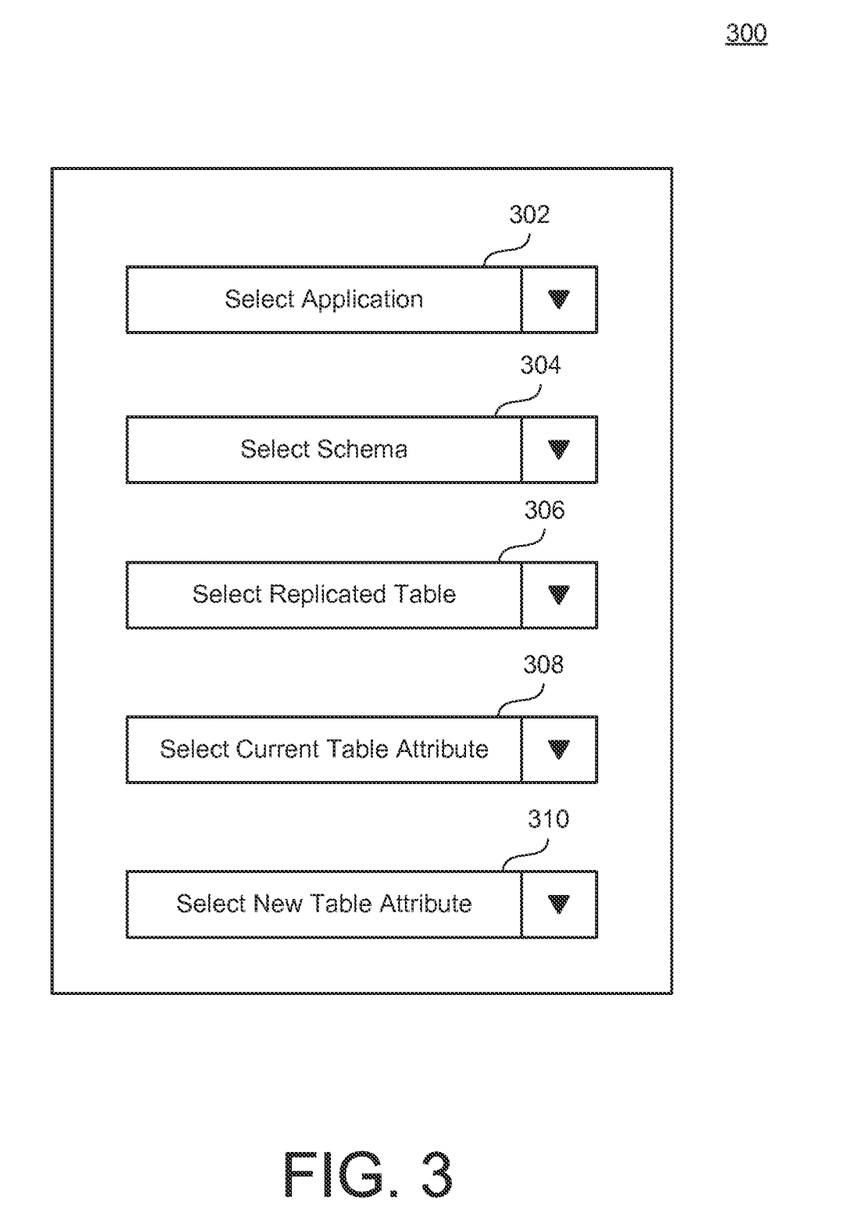
FIG. 3 is a screenshot of an example graphical user interface used in the system of FIG. 1.

FIG. 3 is an example of a graphical user interface (GUI) 300 that may be used in the system 100 of FIG. 1. For example, the GUI 300 may be provided by the view generator 122, and may be used to provide inputs governing behaviors of, e.g., the table selector 114 and the table attribute selector 118. Of course, it may be appreciated that the GUI 300 is a simplified, conceptual example of one or more types of user interfaces that might be provided by the view generator 122, and is not intended to provide an exhaustive or complete listing of related features of such user interfaces.

In the example of FIG. 3, a drop-down menu 302 is provided to enable an operator of the system 100 to select an application associated with a replicated table. For example, the drop-down list 302 may include a listing of applications such as the application 112 within the second system 106. As referenced above, it may occur that multiple such applications are currently being implemented by the second system 106, so that it is necessary to designate the application 112 specifically. In other example implementations, however, it may occur that only a single application is currently being executed by the second system 106, and/or that the replicated table 110 is associated with two or more such applications.

Further in FIG. 3, a drop-down list 304 is provided which lists all relevant database schemas for the selected application of the drop-down list 302. That is, for example, the application 112 and the replicated table 110 may characterize associated data with respect to a plurality of database schemas. For example, multiple types of data may be related to performing a particular function of the application, and may be organized according to the first database schema, while other portions of the data may be associated with a different function, and may be associated with a different database schema. By selecting a desired schema using the drop-down list 304, the operator may simultaneously select all replicated tables associated with the selected schema. For example, such an ability may provide a convenience to the operator of the system 100, as compared to requiring the operator to select replicated tables on a table-by-table basis.

Meanwhile, a third drop-down list 306 provides the operator of the system 100 with an ability to select replicated tables on a table-by-table basis. For example, the operator of the system 100 may use the drop-down list 306 to select one or more individual replicated tables, irrespective of any selected schema. In other example implementations, the drop-down list 306 may enable the operator of the system 100 to restrict or augment lists of replicated tables selected using the drop-down list 304. In other words, for example, the operator of the system 100 may select a particular database schema and associated group of replicated data tables using the drop-down list 304, and may add one or more individual replicated tables not associated with the selected database schema, using the drop-down list 306. In other examples, the operator of the system 100 may select a particular database schema and all associated replicated tables using the drop-down list 304, and may then restrict or filter individual replicated tables from the group associated with the database schema, using the drop-down list 306.

Using a drop-down list 308, the operator of the system 100 may select a table attribute of the one or more selected replicated tables. That is, the operator of the system 100 may select a current, existing replicated table attribute. For example, the operator may select a table attribute designating the replicated table 110 as being a row-based table.

Then, using a drop-down list 310, the operator may select a new or desired replicated table attribute. In other words, the drop-down list 310 allow selection of a new table attribute, from which the current, existing table attribute of the drop-down list 308 may be altered or replaced. For example, continuing the example above, the drop-down list 310 may be used to select a new table attribute specifying that the replicated table 110 be organized as a column-based table.

In such examples, various optimizations may be implemented. For example, a selection of a particular table attribute using the drop-down list 308 may cause a corresponding restriction of available table attributes provided by the drop-down list 310, so that available selections within the drop-down list 310 reflect only those table attributes which might correspond to the selected, current table attribute of the drop-down list 308. Put another way, the drop-down list 310 may be filtered in response to a selection made using the drop-down list 308, so that the selections of the drop-down list 310 reflect only those change procedures of the change procedures 120 which correspond to the selected table attribute of the drop-down list 308.

The GUI of FIG. 3 illustrates drop-down lists 302-310 as techniques for making the various selections described with respect thereto. However, of course it may be appreciated that any other known or future techniques for graphically representing options in receiving selections therefrom may be used. For example, for a given drop-down list of the drop-down list 302-310, the GUI 300 might include a listing of available choices, so that the operator of the system 100 may simply designate one of the listed options. Further, the GUI 300 illustrates a single screen, whereas, in other example implementations, multiple screens might be used, so that, for example, different screens may be provided by the view generator 122, based on selections made by the operator of the system 100 during interactions with preceding screens.

In all such implementations, it may be appreciated that the GUI 300, or various instances thereof, provide the operator of the system 100 with a straightforward, convenient manner in which to interact with the table selector 114 and the table attribute manager 116, without requiring technical knowledge on the part of the operator. For example, the operator is not required to be capable of constructing or implementing the specific SQL commands of the change procedures 120 in order to obtain a desired change in a table attribute of the replicated table 110.

Figure 4:
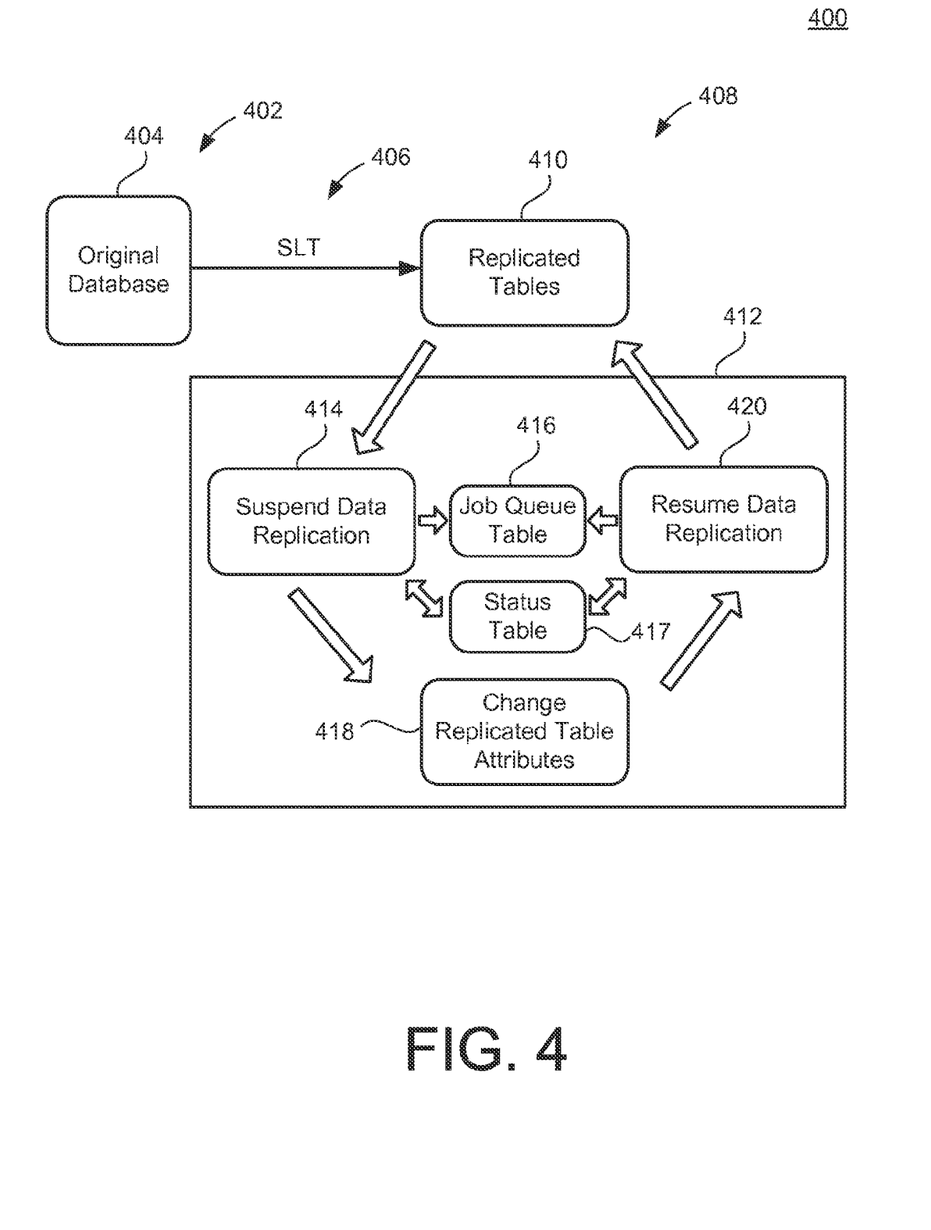
FIG. 4 is a block diagram illustrating architectural components and an associated process flow in a more specific example implementation of the system of FIG. 1.

FIG. 4 is a block diagram of an example implementation of the system 100 of FIG. 1, illustrating an order of operations of interacting components of the architecture. More specifically, the system 400 illustrates an example scenario in which a customer 402 having an original database 404 utilizes the SAP Landscape Transformation (SLT) tool to replicate and synchronize data from the original database 404 to a HANA system 408, thereby creating replicated tables 410. Thus, FIG. 4 (as well as FIGS. 5 and 6, below) illustrates specific example implementations in which SLT replication 406 for the HANA system 408 provides the customer 402 with an ability to implement customized requirements to fulfill specific business scenarios, in a convenient and straightforward manner.

Figure 5:
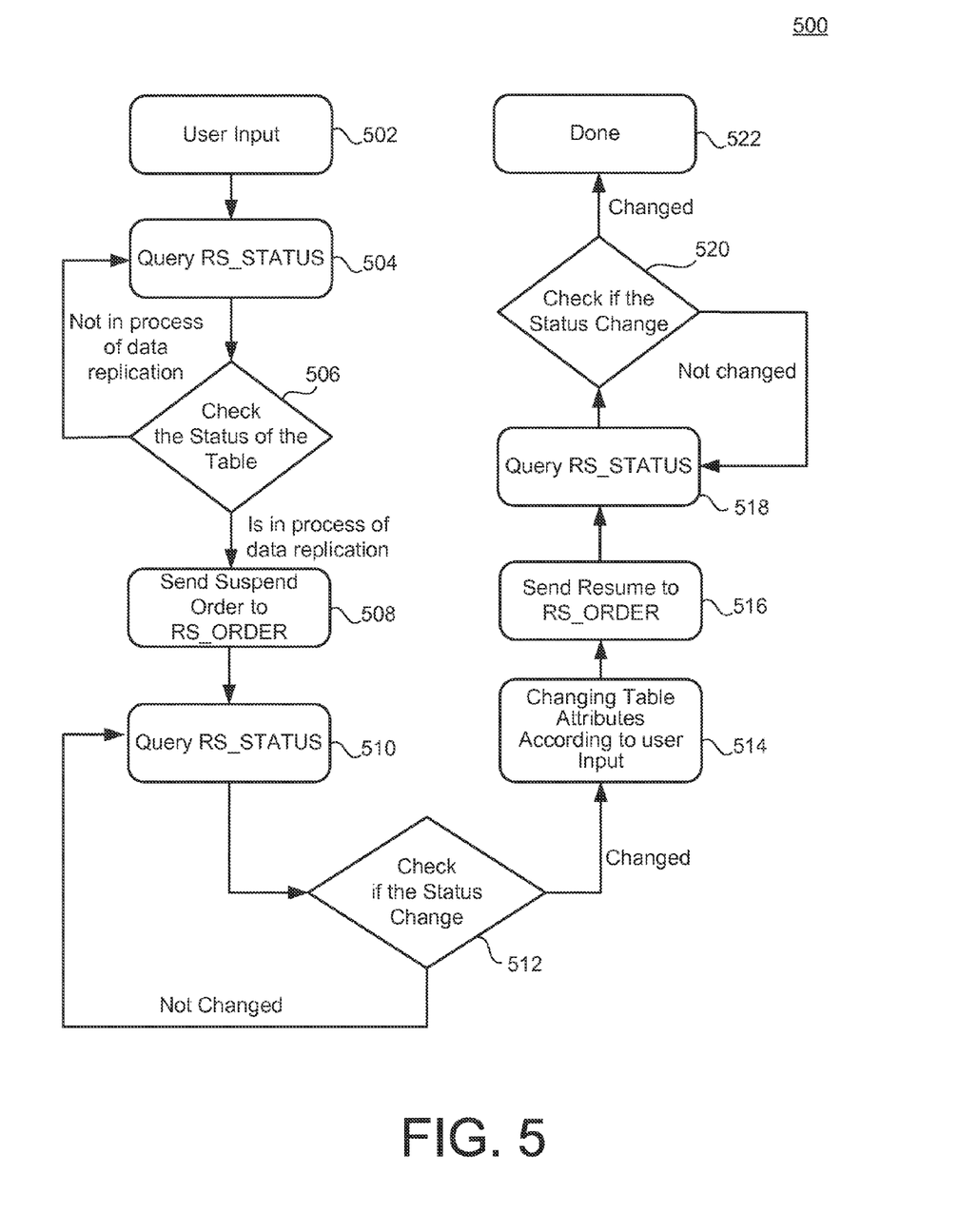
FIG. 5 is a flowchart illustrating example operations of the system of FIG. 4.
Figure 6:
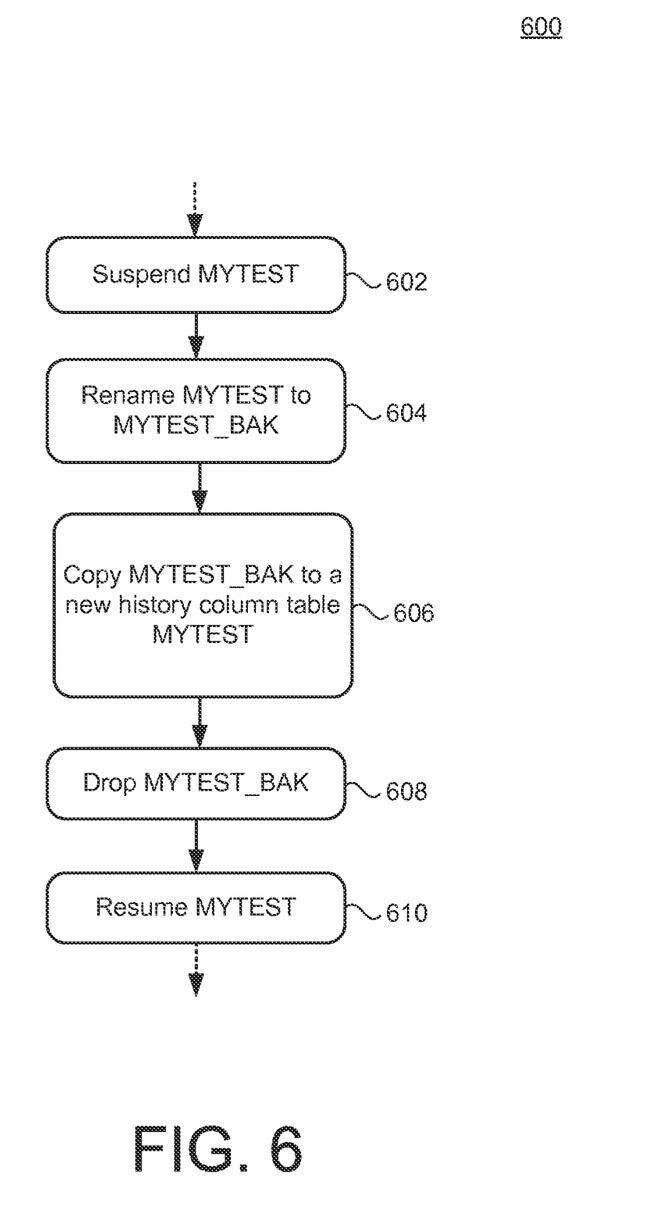
FIG. 6 is a flowchart illustrating more detailed example operations of the examples of FIGS. 4 and 5, in the context of a specific example implementation thereof.

As referenced above, and as may be appreciated from the examples of FIGS. 4-6, when applications are constructed and deployed for the HANA system 408, the original database 404 of the customer 402 may vary, for example, with respect to other databases of the customer 402, or other customers. For example, the original database 404 may be associated with an SQL server, an existing SAP application, or a flat file system, to give a few examples. The SLT replication 406 of the customer 402 to replicate the customer's original data 404 and to the HANA system 408 may be used, e.g., to thereby provide real-time or near real-time data replication.

In the example of FIG. 4, the target replicated tables generated by the SLT replication 406 may most commonly be generated as, e.g., column tables, without any customizable features, so that, in some cases, the replicated tables 410 may be ill-equipped or unable to fulfill a business requirement for which they were replicated to the HANA system 408 in the first place. Moreover, because the SLT replication 406 typically compares table structures of the original database 404 and the replicated tables 410 during the replication process, any manual and/or incorrect procedure for modifying the table attributes of the replicated tables 410 might result in failure of the SLT replication process 406.

Therefore, in order to avoid such results, and to enable the customer 402 to manage attributes of the replicated tables 410, a box 412 illustrates an order of operations and interactions between components of the system 100 of FIG. 1, in accordance with the description of FIGS. 1-3 provided above, and within the specific example of FIG. 4. Specifically, as shown, box 414 illustrates that suspension of data replication may be implemented through issuance of a suspension command to a job queue table 416. More specifically, in the SLT replication 406, a table RS_ORDER may represent the job queue table 416. Further, upon issuance of the suspension command to the job queue table 416, verification of implementation of the suspension order within the job queue table 416 may occur through communication with a status table 417, which is configured to monitor the job queue table 416 to determine a current status of one or more orders contained therein. For example, in the SLT replication 406, a table RS_STATUS may be used to implement the status table 417.

Once the status table 417 provides verification that the job queue table 416 reflects suspension of data replication from the original database 404 to the one or more replicated tables 410, then, as indicated by box 418, changing of replicated table attributes of the replicated tables 410 may proceed. For example, it may be appreciated that the box 418 refers to, and includes, operations of the customer 402 in interacting with, e.g., the GUI 300, and therefore reflects actions of the customer 402 with respect to directing the table selector 114 and the table attribute manager 116, through interactions with the view generator 122. In this way, as described, the customer 402 is provided with an ability to customize the target replicated tables 410, and thereby fully utilize, in the example, the available features and functions of the HANA system 408.

Moreover, as referenced above with respect to FIG. 3, the customer 402 may be able to change different table attributes of different tables, e.g., in a batch format, even if some or all of the selected replicated tables are included within two or more different database schemas. Therefore, for example, the customer 402 may not be required to customize replicated tables within different schemas on a table-by-table basis.

As referenced above, the type and nature of replicated table attributes that may be changed may include virtually any table attribute that may exist with respect to the replicated tables 410, and may depend somewhat on a nature of the original database 404 and/or on a nature of a system implementing the replicated tables, e.g., the HANA system 408 of FIG. 4. Nonetheless, for the examples above, additional or alternative examples of such table attributes may include partition attributes, such as added or new partitions for column tables. In further examples, plain column tables may be changed to column history tables. Further, table attributes may include functionalities associated with a given replicated table. For example, auto merge functionality or text search functionality/capability may be turned off/on or modified.

FIG. 5 is a flowchart 500 illustrating more detailed example operations for the example FIG. 4. In the example of FIG. 5, user input is received (502). Specifically, as may be appreciated from the above discussions of FIGS. 1-4, such user input may specify one or more applications and/or related replicated tables to be altered. Thus, for example, the user input may be parsed to determine whether the user input is requesting a table attribute change operation for a specific database schema, in which case, the information of the various associated tables may be retrieved from an appropriate system table of, e.g., the HANA system 408 in the example of FIG. 4, and thereafter transformed into a list of tables. In this way, for example, the resulting list of the identified set of tables may be combined with a list of the specified, desired table attribute change operations, to thereby form a single list. Further, if the user input specifies a particular schema along with one or more additional individual tables, the schema may be parsed and the identified tables may be added within the list in conjunction with a listing of the unidentified, individual tables, and along with the listing of the replicated table attribute change operations to be implemented.

Once the list of tables and table attribute change operations is compiled, the RS_STATUS table 417 may be queried (504). In the example of FIG. 5, and with reference to the more specific examples of FIG. 6, an example replicated table MYTEST is considered to represent the replicated tables 410 of FIG. 4 (or the replicated table 110 of FIG. 1).

Therefore, in the example of FIG. 5, the status of the example table MYTEST may be checked (506), to determine whether the table MYTEST is currently in a process of data replication. In other words, the system first checks whether the identified example MYTEST is currently experiencing data replication. If not, as shown, the query of the table RS_STATUS (504) may continue, until the check (506) of the status of the MYTEST table within the RS_STATUS table determines that the replication status of the example table MYTEST indicates that a process of data replication is occurring.

In specific examples, table 1, below, may be used to record a status of a replication process:

TABLE 1

| Column | Data Type | Comments |
| --- | --- | --- |
| TABLENAME | NVARCHAR(128) | Name of the ERP table |
| ACTION | NVARCHAR(1) | Current action performed by replication software |
| STARTTIME | TIMESTAMP | Start of action |
| ORDERID | INTEGER | Optional unique identifier for messages |
| ENDTIME | TIMESTAMP | End of action |
| STATUS | NVARCHAR(1) | Status of the corresponding action |

Table 1 thus enables tracking and checking of a replicated table status, where individual status codes used to represent a status of a corresponding replicated table are provided in table 2:

TABLE 2

| Status Code | Definition | Remarks |
| --- | --- | --- |
| P | In Process | Final status for started replication |
| X | Executed | Final status for non-continuous operations |
| E | Error | Final status in case of any error |
| O | Obtained | Temporary status to signal replication software has been retrieved the request |
| B | Blocked | Temporary status |

Therefore, with respect to the operation 506, it may be appreciated that Table 1 and Table 2 may be used to ensure that a current replication status of the example table MYTEST is set to (P), which, as illustrated in the example of table 2, indicates that the replication is in process.

Once the replication process is determined to be active, as just described, a suspend order for suspending the data replication process may be sent to the table RS_ORDER (508). As referenced above, the table RS_ORDER, e.g., the job queue table 416 of FIG. 4 (or the job queue 126 of FIG. 1) may be used by the SLT replication 406 of FIG. 4 to enable communications between the HANA system 408 and the replication software of the SLT system 406.

For example, table 3 illustrates that the RS_ORDER table may be used to identify individual tables by name, actions representing current actions being performed by the SLT replication software, and an order identifier or ID which uniquely identifies messages associated with corresponding actions.

TABLE 3

| Column | Data Type | Comments |
| --- | --- | --- |
| TABLENAME | NVARCHAR(128) | Name of the ERP table |
| ACTION | NVARCHAR(1) | Current action performed by replication software |
| ORDERID | INTEGER | Optional unique identifier for messages |

Therefore, as referenced above, in order to manipulate the SLT replication system 406, corresponding records may be inserted into the RS_ORDER table of Table 3, so that corresponding actions will be undertaken. Table 4 illustrates example action codes which may be used to identify individual ordered actions in the context of Table 3. As shown, for example, the action code "S" is associated with suspension of an existing data replication, while action code "W" is associated with a subsequent wakeup of a previously-suspended replication.

TABLE 4

| Column | Data Type | Comments |
| --- | --- | --- |
| TABLENAME | NVARCHAR(128) | Name of the ERP table |
| ACTION | NVARCHAR(1) | Current action performed by replication software |
| ORDERID | INTEGER | Optional unique identifier for messages |

Therefore, with reference back to FIG. 5, once the order with the action code "S" is inserted into the RS_ORDER table, the RS_STATUS table may be queried (510) to track and verify that the ordered action is consumed. Therefore, if the status is checked and determined to be unchanged (512), then the querying of the RS_STATUS table may continue, until such time as a check of the RS_STATUS table (512) indicates that the corresponding status has been changed (e.g., the status of "in process" represented by status code "P" in Table 2 has been changed to a status of "blocked," represented by status code "B" in Table 2).

Thereupon, the designated replicated table attributes may be changed in accordance with the originally-received user input (514). As already described, pre-stored change procedures 120 may be utilized to execute the table attribute change operations. As also described, such change procedures 120 may be highly customizable to enable any large number of replicated table attribute change operations, which may then be executed in an automatic and mistake-free manner, without requiring a high degree of specialized technical knowledge in the part of the customer 402. Moreover, additional change procedures may be added over time to the change procedures 120, so that the systems 100, 400 may be understood to be highly customizable and adaptable.

Once the specified replicated table attributes have been changed in a desired manner, a resume order may be sent to the RS_ORDER table (516). For example, as referenced, then action code "W" may be inserted into Table 3.

Thereafter, the RS_STATUS table may be queried (518). If a subsequent check determines that the status has not changed (520), then the querying of the RS_STATUS table may continue (518), until the status has changed (520), which thus completes operations of the flowchart 500 (522).

FIG. 6 is a flowchart 600 illustrating specific example operations for implementing the examples of FIGS. 4 and 5. As shown and described, in the example of FIG. 6, the example table MYTEST referenced above is considered to be included within a schema SLT, and is changed into a history column table.

In the example of FIG. 6, the table MYTEST is suspended (602). Specifically, the status table RS_STATUS is queried and the status of the table MYTEST is retrieved. For example, a corresponding status statement may be constructed as: SELECT top 1*FROM RS_STATUS WHERE TABLENAME=' MYTEST' ORDER BY STARTTIME DESC. The query may be repeated until the status is reflected as "R," which, from Table 4, indicates a current replication status.

In order to continue with the suspension of the replicated table MYTEST, a job is added to the job queue table RS_ORDER to execute the suspension. For example, a statement for adding the job order may be represented as: INSERT INTO "SLT"."RS_ORDER" VALUES ('INSTANCE_NAME', 'SERVER_NAME', 'MYTEST',0,'S'). Once the status of replicated table MYTEST is changed to "execute" with respect to the "suspend" action/order, as determined by repeatedly querying the status table RS_STATUS, then operations may proceed.

For example, the following statement may be used, where return of a record indicates successful suspension while otherwise (in the null case), suspension may be considered not yet to have occurred: SELECT TOP 1*from "SLT"."RS_STATUS" WHERE "TABLENAME"='MYTEST' and "STATUS"='X' and "ACTION"='S' order by "STARTTIME" DESC. Then, the replicated table MYTEST may be renamed to MYTEST_BAK (604). For example, the following statement may be used: RENAME MYTEST TO MYTEST_BAK.

Then, MYTEST_BAK may be copied to a new history column table named MYTEST (606). That is, a history column table MYTEST may be created with a same schema and data as the original MYTEST, using the following statement: CREATE HISTORY COLUMN TABLE MYTEST LIKE MYTEST_BAK WITH DATA.

Then, the MYTEST_BAK table may be dropped (608), using the statement: DROP TABLE MYTEST_BAK. Then, a job may be added to the job queue table RS_ORDER to resume data replication for the replicated table MYTEST. For example, the statement: INSERT INTO "SLT"."RS_ORDER" VALUES (INSTANCE_NAME; 'SERVER_NAME', 'MYTEST',0,'W'); may be used. In this way, resumption of the replicated table MYTEST may occur (610). As described, checking whether the table MYTEST has successfully resumed data replication may occur by repeatedly querying the status table RS_STATUS. Specifically, if the status is successfully changed to "P," then a record will be returned for the following statement: SELECT TOP 1*from "SLT"."RS_STATUS" WHERE "TABLENAME"='MYTEST' and "STATUS"='P' and "ACTION"='W' order by "STARTTIME" DESC. Otherwise, a no-result will be returned and querying will continue until resumption of data replication has been verified.

As described, the various SQL statements 1-8 provided above may be wrapped inside a single stored change procedure that is included within the change procedures 120 of FIG. 1, including all necessary variants and parameters. Consequently, as described, the resulting change procedure may be executed completely based on user input received from the customer 402, using, for example, a corresponding GUI such as the GUI 300 of FIG. 3. In this way, as described, the customer 402 may be provided with a fast, convenient, and reliable technique for selecting and changing specific replicated table attributes within the systems of FIGS. 1 and 4, and variations thereof.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Non-transitory information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, and executable by at least one processor, the system comprising:
a table selector configured to cause the at least one processor to receive a selection of a replicated table storing data replicated from an original table of a first system, the replicated table being stored using a second system and currently executing a process of receiving the replicated data, wherein the original table and the replicated table share a table attribute;
a suspension manager configured to cause the at least one processor to suspend the process of receiving the replicated data; and
a table attribute manager configured to cause the at least one processor to change the table attribute for the replicated table into a replicated table attribute to facilitate a data processing requirement for the replicated table with a data processing capability of the second system, while the process of receiving the replicated data is suspended;
wherein the suspension manager is further configured to cause the at least one processor to resume the process of receiving the replicated data for storage in the second system in accordance with the replicated table attribute, after completion of the change of the table attribute into the replicated table attribute.

2. The system of claim 1, wherein the table selector is configured to select the replicated table based on receipt of a selection of a database schema that includes the replicated table.

3. The system of claim 1, wherein the table selector is configured to select the replicated table based on receipt of a selection of an application utilizing the replicated table.

4. The system of claim 1, wherein the suspension manager is configured to cause the at least one processor to suspend the process of receiving the replicated data including inserting a suspend order into a job queue governing data replication job orders.

5. The system of claim 4, wherein the suspension manager is configured to cause the at least one processor to suspend the process of receiving the replicated data including querying a status table to determine that a status of the inserted suspend order indicates that the suspension of the process of receiving the replicated data has occurred.

6. The system of claim 5, wherein the suspension manager is configured to cause the at least one processor to resume the process of receiving the replicated data including inserting a resume order into the job queue.

7. The system of claim 6, wherein the suspension manager is configured to cause the at least one processor to resume the process of receiving the replicated data including querying the status table to determine that a status of the inserted resume order indicates that the resumption of the process of receiving the replicated data has occurred.

8. The system of claim 1, wherein the replicated table attribute includes one or more of a column table attribute, a row table attribute, a partition of the replicated table, a plain column table, a history column table, an auto-merge capability or a text search capability.

9. The system of claim 1, wherein the table attribute manager includes a table attribute selector configured to cause the at least one processor to access a plurality of pre-stored change procedures for implementing changes to table attributes to obtain replicated table attributes, and further configured to cause the at least one processor to select a corresponding pre-stored change procedure therefrom to implement the change of the table attribute into the replicated table attribute.

10. The system of claim 1, further comprising a view generator configured to cause the at least one processor to provide at least one graphical user interface configured to receive the selection of the replicated table and the change of the table attribute into the replicated table attribute.

11. A computer-implemented method for executing instructions stored on a non-transitory computer readable storage medium, the method comprising:
receiving a selection of a replicated table storing data replicated from an original table of a first system, the replicated table being stored using a second system and currently executing a process of receiving the replicated data, wherein the original table and the replicated table share a table attribute;
suspending the process of receiving the replicated data;
changing the table attribute for the replicated table into a replicated table attribute to facilitate a data processing requirement for the replicated table with a data processing capability of the second system, while the process of receiving the replicated data is suspended; and
resuming the process of receiving the replicated data for storage in the second system in accordance with the replicated table attribute, after completion of the change of the table attribute into the replicated table attribute.

12. The method of claim 11, wherein the changing comprises:
accessing a plurality of pre-stored change procedures for implementing changes to table attributes to obtain replicated table attributes; and
selecting a corresponding pre-stored change procedure therefrom to implement the change of the table attribute into the replicated table attribute.

13. The method of claim 11, further comprising providing at least one graphical user interface configured to receive the selection of the replicated table and the change of the table attribute into the replicated table attribute.

14. A computer program product, the computer program product being tangibly embodied on a non-transitory computer-readable storage medium and comprising instructions that, when executed by at least one processor, are configured to:
execute a replication of an original table of a first system to obtain a replicated table in a second system, the original table and the replicated table sharing a table attribute characterizing an original data structure of data stored in the original table and the replicated table;
receive a selection of the replicated table during a process of receiving the replicated data;
suspend the process of receiving the replicated data;
change the table attribute into a replicated table attribute of the replicated table, thereby re-structuring storage of the replicated data within the second system to conform with a replicated data structure, while the process of receiving the replicated data is suspended; and
resume the process of receiving the replicated data in accordance with the replicated data structure.

15. The computer program product of claim 14, wherein the instructions, when executed, are further configured to cause the at least one processor to suspend the process of receiving the replicated data including inserting a suspend order into a job queue governing data replication job orders.

16. The computer program product of claim 15, wherein the instructions, when executed, are further configured to cause the at least one processor to suspend the process of receiving the replicated data including querying a status table to determine that a status of the inserted suspend order indicates that the suspension of the process of receiving the replicated data has occurred.

17. The computer program product of claim 16, wherein the instructions, when executed, are further configured to cause the at least one processor to resume the process of receiving the replicated data including inserting a resume order into the job queue.

18. The computer program product of claim 17, wherein the instructions, when executed, are further configured to cause the at least one processor to resume the process of receiving the replicated data including querying the status table to determine that a status of the inserted resume order indicates that the resumption of the process of receiving the replicated data has occurred.

19. The computer program product of claim 14, wherein the instructions, when executed, are further configured to cause the at least one processor to access a plurality of pre-stored change procedures for implementing changes to table attributes to obtain replicated table attributes, and further configured to cause the at least one processor to select a corresponding pre-stored change procedure therefrom to implement the change of the table attribute into the replicated table attribute.

20. The computer program product of claim 14, wherein the instructions, when executed, are further configured to cause the at least one processor to provide at least one graphical user interface configured to receive the selection of the replicated table and the change of the table attribute into the replicated table attribute.

* * * * *